（12）United States Patent
Parsoneault et al.

(10) Patent No.: US 7,959,357 B2
(45) Date of Patent: Jun. 14, 2011

(54) FLUID DYNAMIC BEARING SPINDLE MOTOR

(75) Inventors: Norbert Steven Parsoneault, Scotts Valley, CA (US); Bao Trinh, Milpitas, CA (US); JimPo Wang, Pleasanton, CA (US); Jerry Joseph Weingord, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 592 days.

(21) Appl. No.: 10/815,130

(22) Filed: Mar. 31, 2004

(65) Prior Publication Data

US 2004/0223255 A1 Nov. 11, 2004

Related U.S. Application Data

(60) Provisional application No. 60/468,804, filed on May 7, 2003.

(51) Int. Cl.
*F16C 32/06* (2006.01)

(52) U.S. Cl. ........................................ 384/114; 384/120

(58) Field of Classification Search .................. 384/100, 384/107, 108, 109, 114, 118, 119, 120, 121, 384/123, 132
See application file for complete search history.

(56) References Cited

U.S. PATENT DOCUMENTS

| | | | |
|---|---|---|---|
| 4,934,836 A * | 6/1990 | Tanaka et al. ................ 384/100 |
| 4,938,611 A * | 7/1990 | Nii et al. ....................... 384/133 |
| 5,009,520 A * | 4/1991 | Takajo et al. ................ 384/100 |
| 5,516,212 A * | 5/1996 | Titcomb ....................... 384/107 |
| 5,715,116 A * | 2/1998 | Moritan et al. ............ 360/99.08 |
| 5,716,141 A * | 2/1998 | Chen ............................. 384/114 |
| 5,924,798 A * | 7/1999 | Usui ............................. 384/114 |
| 6,034,454 A * | 3/2000 | Ichiyama ........................ 310/90 |
| 6,250,807 B1 * | 6/2001 | Mori et al. .................... 384/100 |
| 2001/0022869 A1 * | 9/2001 | Tanaka et al. ................ 384/100 |
| 2003/0185473 A1 * | 10/2003 | Gomyo et al. ................ 384/107 |

* cited by examiner

*Primary Examiner* — Justin Krause
(74) *Attorney, Agent, or Firm* — McCarthy Law Group

(57) ABSTRACT

A fluid dynamic bearing motor is described. In one embodiment, the fluid dynamic bearing motor includes a base that has a bore hole and a liner secured within the bore hole. The fluid dynamic bearing motor also includes a rotor assembly that has a shaft, which is partially disposed within the liner and configured to rotate relative to the liner. A fluid dynamic bearing is disposed between the liner and the shaft to support this relative rotation.

20 Claims, 4 Drawing Sheets

FLUID DYNAMIC BEARING SPINDLE MOTOR

CROSS-REFERENCE TO RELATED APPLICATION

This application relates to, and claims the priority benefit of U.S. Provisional Patent Application No. 60/468,804, titled "Low Cost Fluid Dynamic Bearing Motor," filed on May 7, 2003. The subject matter of the related application is hereby incorporated by reference.

FIELD OF THE INVENTION

Embodiments of the invention generally relate to fluid dynamic bearing motors and more specifically relate to fluid dynamic spindle motors suitable for disc drive applications.

BACKGROUND OF THE INVENTION

To meet demands for the applications in storage of consumer electronics—audio and video—a low-cost, hard disc drive is essential. The cost of currently available hard disc drives drastically exceeds the price level for audio and video applications needed to make those products affordable to consumer mass markets. Thus, it is desirable to reduce the cost of the components and labor required to fabricate a hard disc drive in order to reduce the overall cost.

Balanced by the demand for a low-cost motor for disc drives, there is an ever-increasing demand for disc drive performance. As the density of information stored on discs has increased, the size of the storage system has decreased. Correspondingly, greater precision and lower tolerance in the manufacturing is increasingly required for robust and reliable operation of disc drives. For example, to achieve increased storage densities, the read/write heads must be placed increasingly closer to the surface of the storage disc.

From the foregoing discussion, it can be seen that the bearing assembly which enables the storage disc to rotate is of critical importance. One bearing design is a fluid dynamic bearing. In a fluid dynamic bearing, a lubricating fluid such as oil, among other fluids, provides a bearing surface between a fixed member of the housing (i.e., the shaft) and a rotating member of the disc hub. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeatable run-out. Thus, fluid dynamic bearings are an advantageous bearing system that enhances disc drive performance.

However, the greater precision and lower tolerance required for the fabrication of robust disc drives having fluid dynamic bearing motor presents a major obstacle in producing drives at a cost desirable for consumer mass markets. Therefore, there is a need for an improved fluid dynamic bearing motor having reduced fabrication costs without sacrificing drive performance by reducing stiffness or otherwise.

SUMMARY OF THE INVENTION

One embodiment of a fluid dynamic bearing motor includes a base that has a bore hole and a liner secured within the bore hole. The fluid dynamic bearing motor also includes a rotor assembly that has a shaft, which is partially disposed within the liner and configured to rotate relative to the liner. A fluid dynamic bearing is disposed between the liner and the shaft to support this relative rotation.

One advantage of the disclosed fluid dynamic bearing motor is that many of its components may be stamped or forged, thereby substantially reducing fabrication costs. Another advantage is that assembling the disclosed fluid dynamic bearing motor (e.g., the base, the liner and the rotor assembly) requires fewer steps, resulting in decreased assembly cycle time and substantial cost savings.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The invention comprises a spindle motor for a disc drive data storage device configured to reduce vibrations and/or acoustic levels in the storage device. In another aspect of the invention, a spindle motor for a disc drive data storage device is provided having an improved fluid dynamic bearing. Although the invention is described with reference to a disc drive application, it is contemplated that the inventive aspects may be utilized in other types of motors and motor applications having fluid dynamic bearings.

Figure 1:
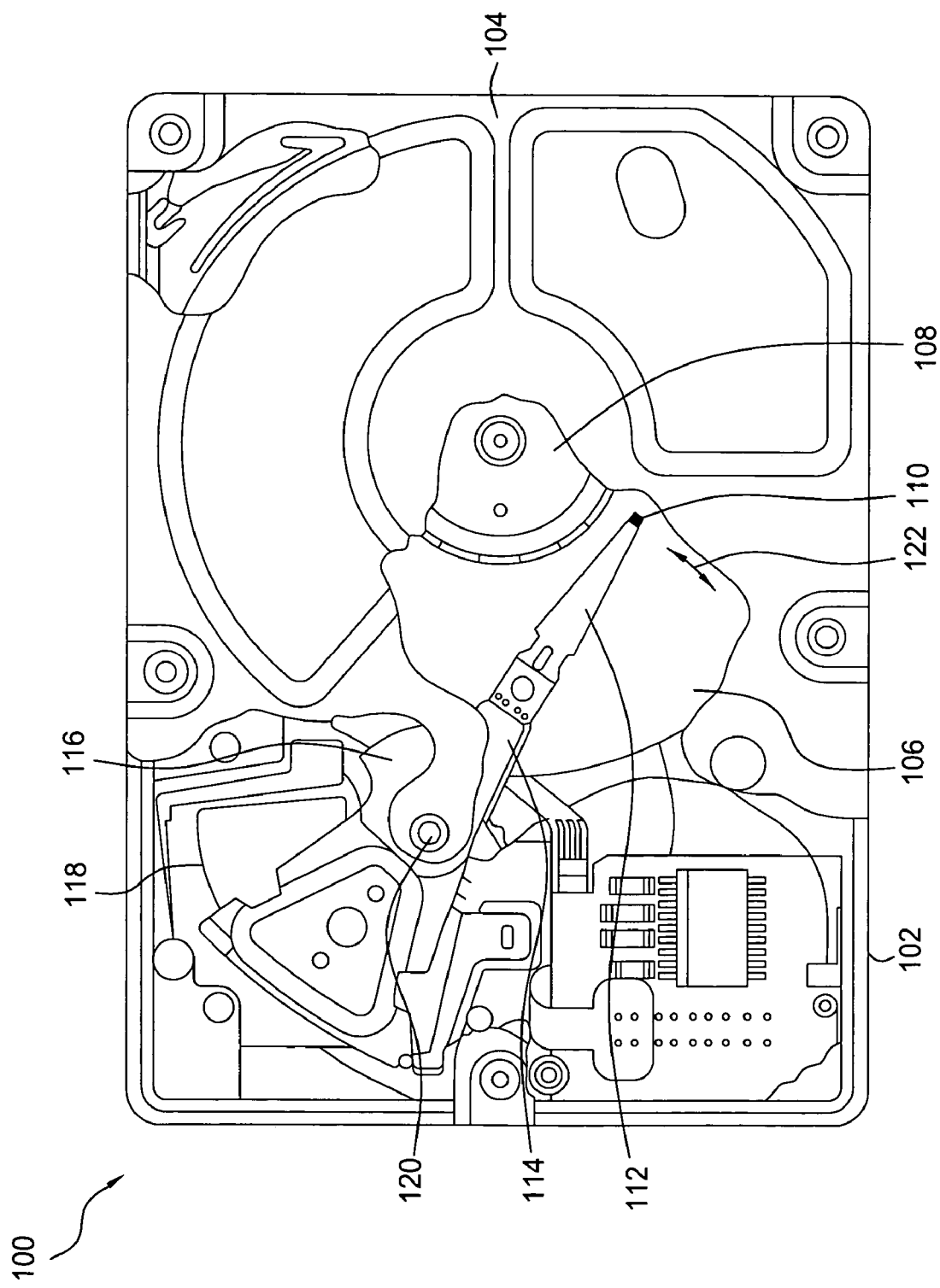
FIG. 1 is a plan view of a disc drive, according to one embodiment of the present invention.

FIG. 1 is a plan view of a disc drive 100, according to one embodiment of the present invention. The disc drive 100 includes a housing 102 and a top cover 104. The housing 102 is combined with top cover 104 to form a sealed environment to protect the internal components of the disc drive 100 from contamination by elements from outside the sealed environment.

The arrangement of the housing 102 and the top cover 104 shown in FIG. 1 is common in the industry. However, other arrangements of the housing components have been frequently used, and the invention is not in any way limited by the configuration of the disc drive housing 102 or the top cover 104.

The disc drive 100 further includes a disc pack 106 that is mounted for rotation on a fluid dynamic bearing spindle motor (not shown) by a disc clamp 108. The disc pack 106 includes at least one or more discs that are mounted for co-rotation about a central axis. Each disc surface has an associated head 110 that is mounted to disc drive 100 for communicating with the disc surface. In the embodiment of FIG. 1, heads 110 are supported by flexures 112 that are in turn attached to head mounting arms 114 of an actuator body 116. The actuator shown in FIG. 1 is of the type known as a rotary moving coil actuator and includes a voice coil motor, shown generally at 118. The voice coil motor 118 rotates actuator body 116 with its attached heads 110 about a pivot shaft 120 to position heads 110 over a desired data track along an arcuate path 122. While a rotary actuator is shown in FIG. 1, the invention is also useful in disc drives having other types of actuators, such as linear actuators.

Figure 2:
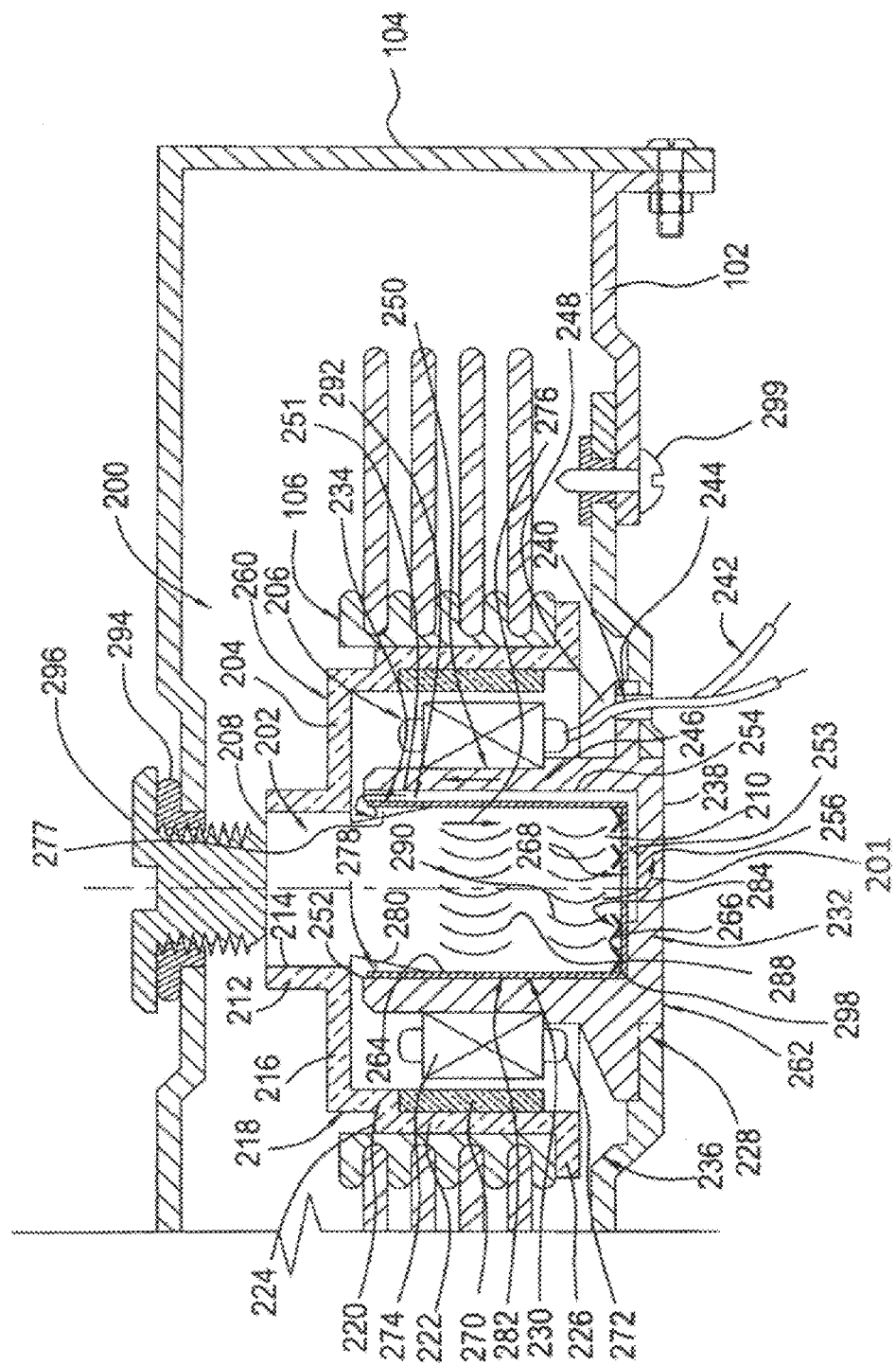
FIG. 2 is a partial sectional view of a fluid dynamic bearing spindle motor, according to one embodiment of the present invention.

FIG. 2 is a partial sectional view of a fluid dynamic bearing spindle motor 200, according to one embodiment of the present invention. The fluid dynamic bearing spindle motor ("FDB spindle motor") 200 includes a fluid dynamic bearing 230 for supporting the rotation of the disc pack 106 of FIG. 1 about a central axis within the disc drive 100. Although the invention has been illustrated within a specific embodiment of the FDB spindle motor 200, it is contemplated that the present invention is useful with other types motors that use fluid dynamic bearings. The present invention therefore is not in any way limited by the particular configurations of the FDB spindle motor 200 and the fluid dynamic bearing 230 described herein.

As shown, the FDB spindle motor 200 includes a rotor assembly 260, a base assembly 262 and a stator 206. The stator 206 is coupled to the base assembly 262 radially inward of a magnet 270. The stator 206 generally includes a stack of stator laminations 272 and associated stator windings 274. The stator 206 is generally retained in the housing 102 by fasteners, adhesives or other conventional methods. The rotor assembly 260 is rotated about base assembly 262 by sequentially energizing the stator windings 274 to alternatively repel and attract the magnetic poles of the magnet 270 attached to the rotor assembly 260, thereby creating a rotational force.

The rotor assembly 260 includes a shaft 202 and a hub 204. A first end 208 of the shaft 202 is secured to the hub 204 so that the shaft 202 rotates with the hub 204 during operation.

The hub 204 generally supports the disc pack 106 for rotation during operation. The hub 204 may be fabricated from a rigid material, such as metal. In one embodiment, the hub 204 is formed from a sheet metal blank using a cold-working process such as, for example, stamping, drawing, spinning or hydroforming. The cold working of the hub 204 during the forming process advantageously strengthens the hub 204, particularly at the bends and draws, thereby providing a stronger component as compared to a conventionally machined hub. Alternatively, the hub 204 may be casted, forged or molded. Each of these processes also produces a less costly hub 204 compared to conventional machining fabrication processes. In another embodiment, the hub 204 may be machined.

In the embodiment of FIG. 2, the hub 204 includes a boss 212 formed at a first end. The boss 212 is configured to accept a first end 208 of the shaft 202. The shaft 202 may be secured to the boss 212 by adhesives, stacking, pressfitting, swaging, pinning or fastening among other methods.

A top annular flange 216 of the hub 204 extends radially outward from the boss 212 to a stepped cylindrical wall 218. The stepped cylindrical wall 218 may extend in the same direction as the boss 212, or as depicted in FIG. 2, may extend concentrically and in a direction opposite to the boss 212.

The stepped cylindrical wall 218 includes an inner cylindrical section 220 and an outer cylindrical section 222. A jog 224 formed between inner cylindrical section 220 and the outer cylindrical section 222 stiffens the stepped cylindrical wall 218 and provides a locating feature for coupling the magnet 270 to the inside of the outer cylindrical section 222 of the hub 204. The outer cylindrical section 222 opposite the jog 224 terminates in an outwardly turned lip 226. The lip 226 and outer cylindrical section 222 provide a surface for locating and mounting the disc pack 106 to the hub 204. The disc pack 106 may be coupled to the outer cylindrical section 222 of the hub 204 by clamping, interference fit, adhesives, fasteners and the like.

The base assembly 262 includes a base 232, a liner 234 and a spine 236. The base 232 is attached to the spine 236. In one embodiment, the spine 236 extends outward from the base 232 to provide an attachment point for the housing 102. As shown in FIG. 2, the housing 102 is secured to the spine 236 by fasteners 299. The base 232 may be machined, molded, casted or forged from a rigid material. The spine 236 may be, for example, stamped, molded or formed. In one embodiment, the spine 236 is stamped from a blank of sheet metal to include sections having different planar orientations such that the spine 236 may be cold-worked during fabrication, thereby resulting in greater strength.

Figure 4:
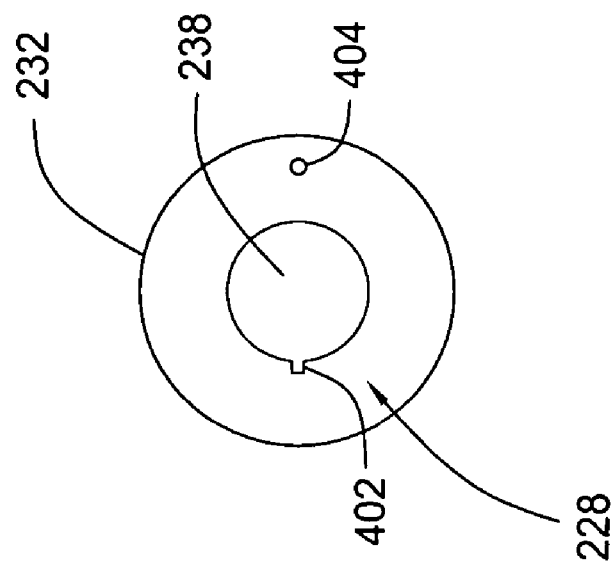
FIG. 4 is a bottom view of the base of FIG. 2, according to one embodiment of the present invention.
Figure 3:
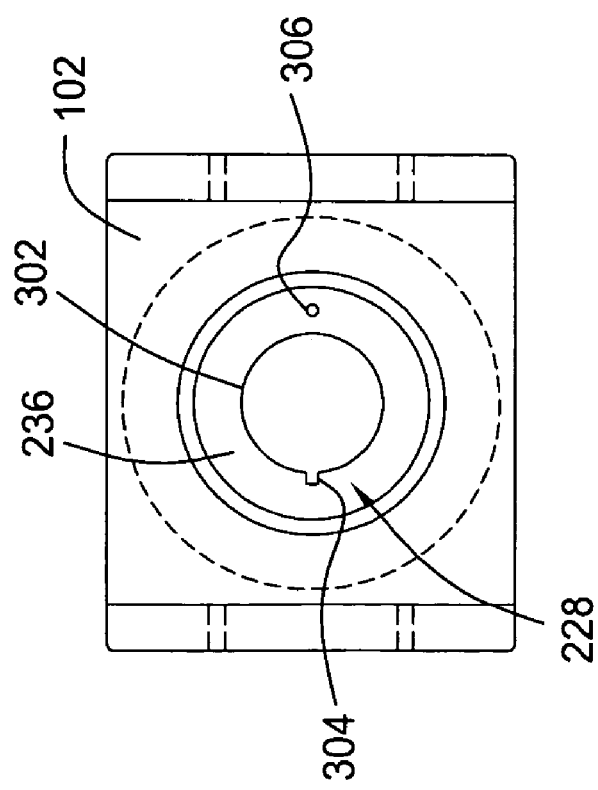
FIG. 3 is a bottom view of the spine of FIG. 2, according to one embodiment of the present invention.

Referring now also to FIGS. 3 and 4, an alignment feature 228 is disposed between the spine 236 and the base 232 to provide orientation between those components. As shown in FIG. 3, in one embodiment, the alignment feature 228 includes a hole 302 having a slot 304 extending from the hole 302 into the spine 236. As shown in FIG. 4, in one embodiment, a tab 402 extends from a cylindrical bottom section 238 of the base 232 is configured to engage the slot 304 (at reference numeral 228 of FIG. 2), thereby securing the base 232 in a predefined orientation relative to the spine 236. It is contemplated that other types of alignment features, such as pins, mating geometry, keys and the like, may be alternatively utilized to align the spine 236 and base 232 in a predefined orientation. The orientation of the spine 236 and base 232 allows holes 306 and 404 formed through the spine 236 and the base 232, respectively, to align, thereby providing a conduit 240 for stator leads 242 to exit the FDB spindle motor 200 as depicted in FIG. 2.

Referring now only to FIG. 2, the base 232 includes a flange 244 separating the lower cylindrical section 238 from an upper cylindrical section 246. The flange 244 provides a mounting surface for coupling the base 232 to the spine 236. Adhesives, fasteners or other means of attachment may be utilized to couple the spine 236 and base 232. A plurality of gussets 248 are provided between the flange 244 and upper cylindrical section 246 to provide rigidity.

The upper cylindrical section 246 of base 232 includes a stepped outer diameter 250 and a bore hole 252. The stepped outer diameter 250 provides a mounting surface for locating and coupling the stator 206 to the base 232. The stator 206 may be coupled to the base 232 by adhesives, clamps, fasteners and the like.

A first groove 254 is formed in the base 232 and extends along a wall 251 of the bore hole 252. The first groove 254 connects to a second groove 256, which is formed in the base 232 and extends along a bottom 253 of the bore hole 252 from approximately the center of the base 232 to the wall of the bore hole 252 (where the second groove 256 meets the first groove 254). The first groove 254 and the second groove 256 may be machined or broached. Further, in embodiments where the base 232 is formed by casting, forging or molding, the first groove 254 and/or the second groove 256 may be integrally formed in the base 232 during fabrication without additional fabrication steps (i.e., formed without any post-casting/forging/molding machining). In alternative embodiments, more than one of the first groove 254 and/or the second groove 256 may be formed in the base 232.

The liner 234 is secured within the bore hole 252, and the shaft 202 is disposed within the liner 234 such that a second end 210 of the shaft 202 is rotatably disposed on a bottom 266 of the liner 234. The liner 234 may be secured within the bore hole 252 by any number of means such as, for example, press fitting, adhering fastening and the like. In one embodiment, the liner 234 is formed from a rigid material and may be stamped or drawn from a metal blank.

Bearing fluid fills the gap(s) between the liner 234 and the shaft 202. The bottom 266 of the liner 234 includes one or more holes 268 to allow bearing fluid to flow from the gap(s) between the liner 234 and the shaft 202 to the second groove 256. The bearing fluid used in FDB spindle motor 200 may be any type of suitable liquid or gas such as, for example, oil or a ferromagnetic fluid.

As persons skilled in the art will understand, and as described herein, the rotation of the hub 204 and the shaft 202 about the base 232 is supported by the fluid dynamic bearing 230 formed between the liner 234 and the shaft 202. As shown, the fluid dynamic bearing 230 includes a journal bearing 282 and thrust bearing 284. The journal bearing 282 is defined between the inner diameter of the liner 234 and the outer diameter of the shaft 202, and the thrust bearing 284 is defined between the bottom 266 of the liner 234 and the bottom surface of the shaft 202. Each of journal bearing 282 and thrust bearing 284 includes at least one bearing surface having a grooved bearing pattern. As is commonly known in the art, these grooved bearing patterns are configured to generate a localized high pressure region within the bearing fluid when the surfaces of a fluid dynamic bearing rotate relative to one another. Thus, as the shaft 202 rotates relative to the liner 234, the high pressure region generated locally to journal bearing 282 provides radial support between the shaft 202 and the liner 234, and the high pressure region generated locally to thrust bearing 284 provides axial support between the shaft 202 and the liner 234. The grooved bearing surfaces of journal bearing 282 and thrust bearing 284 may include any suitable type of grooved bearing pattern, including, without limitation, a pattern of spiral grooves, chevron grooves or sinusoidal grooves. Further, as persons skilled in the art will recognize, either of the shaft 202 or the liner 234 may include one or more bearing surfaces having a grooved bearing pattern. Persons skilled in the art also will understand that a fluid dynamic bearing may comprise one or more sets of grooves.

In the embodiment of FIG. 2, the shaft 202 includes grooved bearing patterns 288 and 290 to provide an outer bearing surface and an inner bearing surface, respectively, of journal bearing 282. Likewise, either the bottom surface of the shaft 202 or the top surface of the bottom 266 of the liner 234 may include a grooved bearing pattern 298 to provide a bearing surface of thrust bearing 284. The journal bearing 282 is configured asymmetrically such that it pumps bearing fluid in a downward direction towards the bottom 266 of the liner 234, as shown by arrow 276. The thrust bearing 284 is configured to pump bearing fluid in a radially inward direction from a wall 264 of the liner 234 towards the center of the base 232 such that the bearing fluid flows through the hole 268 in the liner 234 into the second groove 256, as shown by arrow 201.

The FDB spindle motor 200 also includes at least one recirculation channel 292, defined in part by the first groove 254 and the second groove 256. Among other things, recirculation channel 292 accommodates bearing fluid flow induced by journal bearing 282 and thrust bearing 284 and enforces favorable boundary conditions between fluid dynamic bearing regions. As is described in further detail below in conjunction with FIG. 5, the combined pumping action of the outer part and the inner part of journal bearing 282 and the thrust bearing 284 causes the bearing fluid to flow through the hole 268 into the recirculation channel 292 and through the recirculation channel 292 to the top of a wall 264 of the liner 234. In one embodiment, the bearing fluid flows over the top of wall 264 and into a reservoir 277 of a capillary seal 278, which is defined between the wall 264 and a tapered section 280 of the shaft 202. In such an embodiment, the wall 264 may be shorter than the depth of the bore hole 252. In alternative embodiments, the wall 264 may include one or more slots or apertures through which bearing fluid may flow from the recirculation channel 292 into the reservoir 277 of the capillary seal 278. As is commonly known in the art, the capillary seal 278 retains the bearing fluid within the FDB spindle bearing 200.

As persons skilled in the art will understand, the orientation of the flow of bearing fluid through circulation passage 292 beneficially purges trapped air from the fluid dynamic bearing 230 during operation, thereby enhancing motor performance. More specifically, the pumping action of journal bearing 282 and thrust bearing 284 causes the trapped air to flow through the recirculation channel 292 towards the top of the wall 264 along with the bearing fluid. As the bearing fluid reaches the top of the wall 264 and spill over into the reservoir 277 of capillary seal 278, the trapped air bubbles out of the bearing fluid into the surrounding environment.

In one embodiment, the stator 206 and the magnet 270 are configured to bias the hub 204 downward, thereby maintaining a preloading force against the thrust bearing 284 which contributes to stabilizing the motor 200 during operation. In alternative embodiment, the preloading force may be created in any other feasible way such as, for example, by applying a spring force or a downward-acting pressure force on the hub 204 or by generating a magnetic force between the magnet 270 and either the base 232 or the spine 236. Further, to prevent the hub 204 from excessive movement when subjected to a shock event, the cover 104 may be configured to limit the upward travel of the hub 204. In the embodiment of FIG. 2, a press nut 294 is centrally secured to the cover 104 that allows an adjustment screw 296 to be set in a predefined position relative to the first end 208 of the shaft 202. It is contemplated that the cover 104 may be alternatively spaced-apart from the first end 208 of the shaft 202 a distance that adequately limits the travel of the shaft 202 during shock events.

Figure 5:
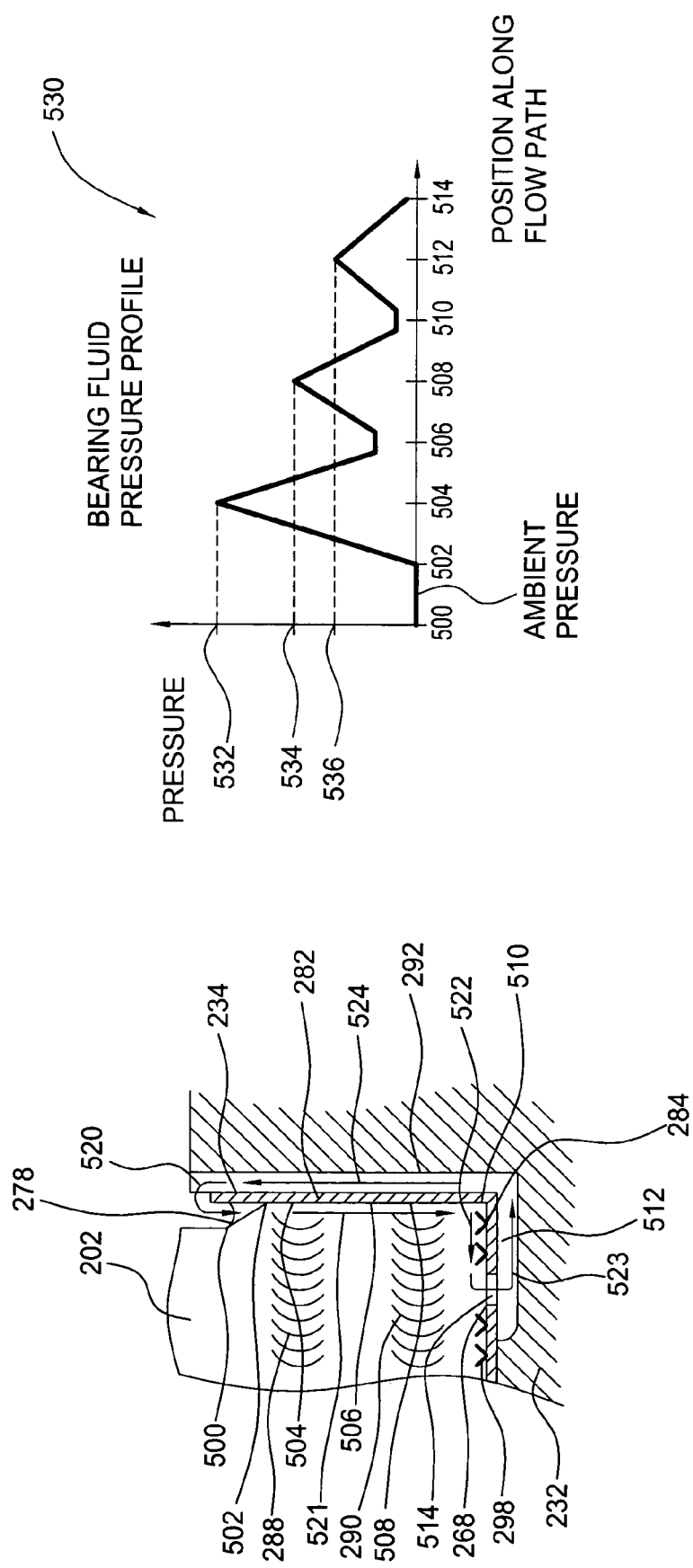
FIG. 5 depicts a graph of a bearing fluid pressure profile as bearing fluid is pumped through the journal bearing and the thrust bearing of FIG. 2, according to one embodiment of the present invention.

FIG. 5 shows one embodiment of a bearing fluid pressure profile 530 as bearing fluid is pumped through the journal bearing 282 and the thrust bearing 284 of FIG. 2, according to one embodiment of the present invention. As shown, and as previously described herein, the pumping action of journal bearing 282 and thrust bearing 284 causes the bearing fluid to circulate within the FDB spindle motor 200 along a flow path depicted by arrows 520, 521, 522, 523 and 524.

In the embodiment depicted in FIG. 5, at a location 500, corresponding to the top of the capillary seal 278, the bearing fluid pressure is approximately equal to ambient pressure. At a location 502, corresponding to the bottom of the reservoir 277 of the capillary seal 278, the pumping action of journal bearing 282 causes the bearing fluid to begin entering the outer part of journal bearing 282, resulting in an increase in bearing fluid pressure. As the pumping action of journal bearing 282 causes the bearing fluid to flow further into the outer part of journal bearing 282, the bearing fluid pressure continues to increase. As the bearing fluid pressure profile 530 shows, the bearing fluid pressure reaches a first peak value 532 at a location 504, corresponding to the apex of the outer part of the journal bearing 282. As the pumping action of journal bearing 282 causes the bearing fluid to flow out of the outer part of the journal bearing 282, the bearing fluid pressure begins to decrease. The bearing fluid pressure stabilizes at a location 506, corresponding to the separation of the outer part and the inner part of the journal bearing 282.

As the pumping action of journal bearing 282 causes the bearing fluid to flow into the inner part of the journal bearing 282, the bearing fluid pressure begins to increase again. As the bearing fluid pressure profile 530 shows, the bearing fluid pressure reaches a second peak value 534 at a location 508, corresponding to the apex of the inner part of the journal bearing 282. The journal bearing 282 may be configured such that first peak value 532 is greater than the second peak value 534. Persons skilled in the art will recognize that this pressure difference enables the bearing fluid to flow along the flow path as depicted by arrow 521. As the pumping action of journal bearing 282 causes the bearing fluid to flow out of the inner part of the journal bearing 282, the bearing fluid pressure begins to decrease again. The bearing fluid pressure stabilizes at a location 510, corresponding to the outer diameter of thrust bearing 284.

As the pumping action of thrust bearing 284 causes the bearing fluid to flow towards the inner diameter of thrust bearing 284, the bearing fluid pressure begins to rise once again. As the bearing fluid pressure profile 530 shows, the bearing fluid pressure reaches a third peak value 536 at a location 512, corresponding to the apex of thrust bearing 284. The journal bearing 282 and the thrust bearing 284 are configured such that the second peak value 534 is greater than the third peak value 536. Persons skilled in the art will recognize that this pressure difference enables the bearing fluid to flow along the flow path as depicted by arrow 522. As the pumping action of the thrust bearing 284 causes the bearing fluid to flow out of the thrust bearing 284, the bearing fluid pressure begins to decrease once again.

At a location 514, corresponding to where the bearing fluid flows through the hole 268 in the liner 234 into the recirculation channel 292 as depicted by the arrow 523, the pressure of the bearing fluid approaches ambient pressure. Again, the continued pumping action of the journal bearing 282 and the thrust bearing 284 causes the bearing fluid to flow through recirculation channel 292 back towards the reservoir 277 of the capillary seal 278 as depicted by arrow 524. At the top of the liner 234, the bearing fluid flows from the recirculation channel back into the reservoir 277 of capillary seal 278 as depicted by arrow 520.

One advantage of the FDB motor 200 described above is that many of its components may be stamped or forged, thereby substantially reducing fabrication costs. Another advantage is that assembling FDB motor 200 (e.g., the base 232, the liner 234 and the rotor assembly 260) requires fewer steps, resulting in decreased assembly cycle time and substantial cost savings.

The invention has been described above with reference to specific embodiments. Persons skilled in the art, however, will understand that various modifications and changes may be made thereto without departing from the broader spirit and scope of the invention as set forth in the appended claims. The foregoing description and drawings therefore are to be regarded in an illustrative rather than a restrictive sense.

What is claimed is:

1. A fluid dynamic bearing motor comprising:
   a base having a closed end and an upstanding section extending from the closed end, the upstanding section and closed end defining a bore in the base;
   a stationary liner in the bore having a longitudinal wall and further having a bottom that is contiguous with the longitudinal wall extending radially inward from the longitudinal wall, the bottom defining a passage through the stationary liner, the liner positioned in contact with the closed end of the base and the upstanding section of the base;
   a rotor assembly having a shaft that is rotatably supported within the liner;
   a fluid dynamic bearing disposed between the shaft and the longitudinal wall;
   a capillary seal between the shaft and the liner having a close mating relationship end in fluid communication with the fluid dynamic bearing and an opposing diverging mating relationship end defining an inlet reservoir; and
   a channel outside the liner being recessed into the closed end and upstanding section of the base and in fluid contact with an outer surface of the liner, the channel operably fluidly communicating recirculating fluid from the fluid dynamic bearing via the passage to the inlet reservoir.

2. The fluid dynamic bearing motor of claim 1, wherein the fluid dynamic bearing comprises a journal bearing operably supporting the shaft in rotation against the longitudinal wall and a thrust bearing operably supporting the shaft in rotation against the bottom.

3. The fluid dynamic bearing motor of claim 1, wherein the shaft comprises a patterned feature that pumps fluid in the fluid dynamic bearing toward the passage.

4. The fluid dynamic bearing motor of claim 3, wherein the patterned feature includes at least two grooved bearing surfaces.

5. The fluid dynamic bearing motor of claim 1, wherein the rotor assembly comprises a flange and a stepped cylindrical sidewall extending from the flange and circumscribing at least a portion of the base.

6. The fluid dynamic bearing motor of claim 1, wherein the liner defines an open end and the channel fluidly connects the fluid dynamic bearing via the passage with the open end.

7. The fluid dynamic bearing motor of claim 1, wherein the channel guides the recirculating fluid around a distal end of the longitudinal wall to enter the inlet reservoir.

8. A fluid dynamic bearing motor comprising:
   a base having a closed end and an upstanding section extending from the closed end, the upstanding section and closed end defining a bore in the base;
   a stationary liner in the bore having a longitudinal wall and further having a bottom that is contiguous with the longitudinal wall extending radially inward from the longitudinal wall, the bottom defining a passage through the stationary liner, the liner supported by the closed end of the base and the upstanding section of the base;
   a rotor assembly having a shaft that is rotatably supported within the liner;
   a fluid dynamic bearing disposed between the shaft and the longitudinal wall;
   a capillary seal between the shaft and the liner having a close mating relationship end in fluid communication with the fluid dynamic bearing and an opposing diverging mating relationship end defining an inlet reservoir; and
   a channel outside the liner being recessed into the closed end and upstanding section of the base and in fluid contact with an outer surface of the liner, the channel operably fluidly communicating recirculating fluid from the fluid dynamic bearing via the passage to the inlet reservoir.

9. The fluid dynamic bearing motor of claim 8, wherein the fluid dynamic bearing comprises a journal bearing operably supporting the shaft in rotation against the longitudinal wall and a thrust bearing operably supporting the shaft in rotation against the bottom.

10. The fluid dynamic bearing motor of claim 8, wherein the shaft comprises a patterned feature that pumps fluid in the fluid dynamic bearing toward the passage.

11. The fluid dynamic bearing motor of claim 10, wherein the patterned feature includes at least two grooved bearing surfaces.

12. The fluid dynamic bearing motor of claim 8, wherein the rotor assembly comprises a flange and a stepped cylindrical sidewall extending from the flange and circumscribing at least a portion of the base.

13. The fluid dynamic bearing motor of claim 8, wherein the liner defines an open end and the channel fluidly connects the fluid dynamic bearing via the passage with the open end.

14. The fluid dynamic bearing motor of claim 8, wherein the channel guides the recirculating fluid around a distal end of the longitudinal wall to enter the inlet reservoir.

15. A fluid dynamic bearing motor comprising:
a base having a closed end and an upstanding section extending from the closed end, the upstanding section and closed end defining a bore in the base;
a stationary liner in the bore having a longitudinal wall and further having a bottom that is contiguous with the longitudinal wall extending radially inward from the longitudinal wall, the bottom defining a passage through the stationary liner, the liner positioned in contact with the closed end of the base and the upstanding section of the base;
a rotor assembly having a shaft that is rotatably supported within the liner;
a fluid dynamic bearing disposed between the shaft and the longitudinal wall;
a capillary seal between the shaft and the liner having a close mating relationship end in fluid communication with the fluid dynamic bearing and an opposing diverging mating relationship end defining an inlet reservoir; and
a channel outside the liner being recessed into at least one of the base and the liner and in fluid contact with an outer surface of the other of the base and liner, the channel operably fluidly communicating recirculating fluid from the fluid dynamic bearing via the passage to the inlet reservoir.

16. The fluid dynamic bearing motor of claim 15, wherein the fluid dynamic bearing comprises a journal bearing operably supporting the shaft in rotation against the longitudinal wall and a thrust bearing operably supporting the shaft in rotation against the bottom.

17. The fluid dynamic bearing motor of claim 15, wherein the shaft comprises a patterned feature that pumps fluid in the fluid dynamic bearing toward the passage.

18. The fluid dynamic bearing motor of claim 15, wherein the rotor assembly comprises a flange and a stepped cylindrical sidewall extending from the flange and circumscribing at least a portion of the base.

19. The fluid dynamic bearing motor of claim 15, wherein the liner defines an open end and the channel fluidly connects the fluid dynamic bearing via the passage with the open end.

20. The fluid dynamic bearing motor of claim 15, wherein the channel guides the recirculating fluid around a distal end of the longitudinal wall to enter the inlet reservoir.

* * * * *